Figure 1:
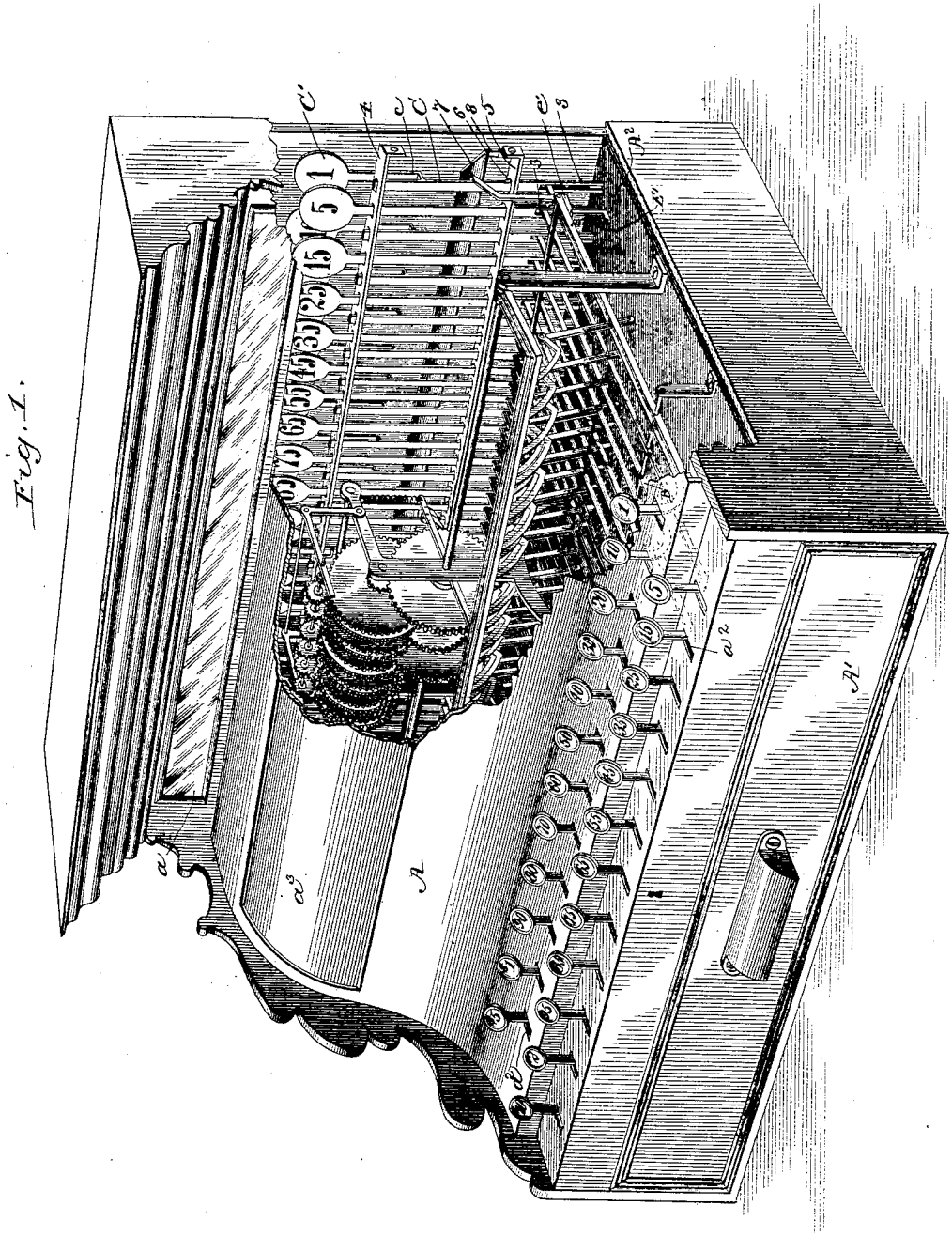

(No Model.)  6 Sheets—Sheet 1.

J. L. TOWNSLEY.
CASH REGISTERING AND INDICATING DEVICE.

No. 394,894.   Patented Dec. 18, 1888.

(No Model.) 6 Sheets—Sheet 2.
J. L. TOWNSLEY.
CASH REGISTERING AND INDICATING DEVICE.
No. 394,894. Patented Dec. 18, 1888.
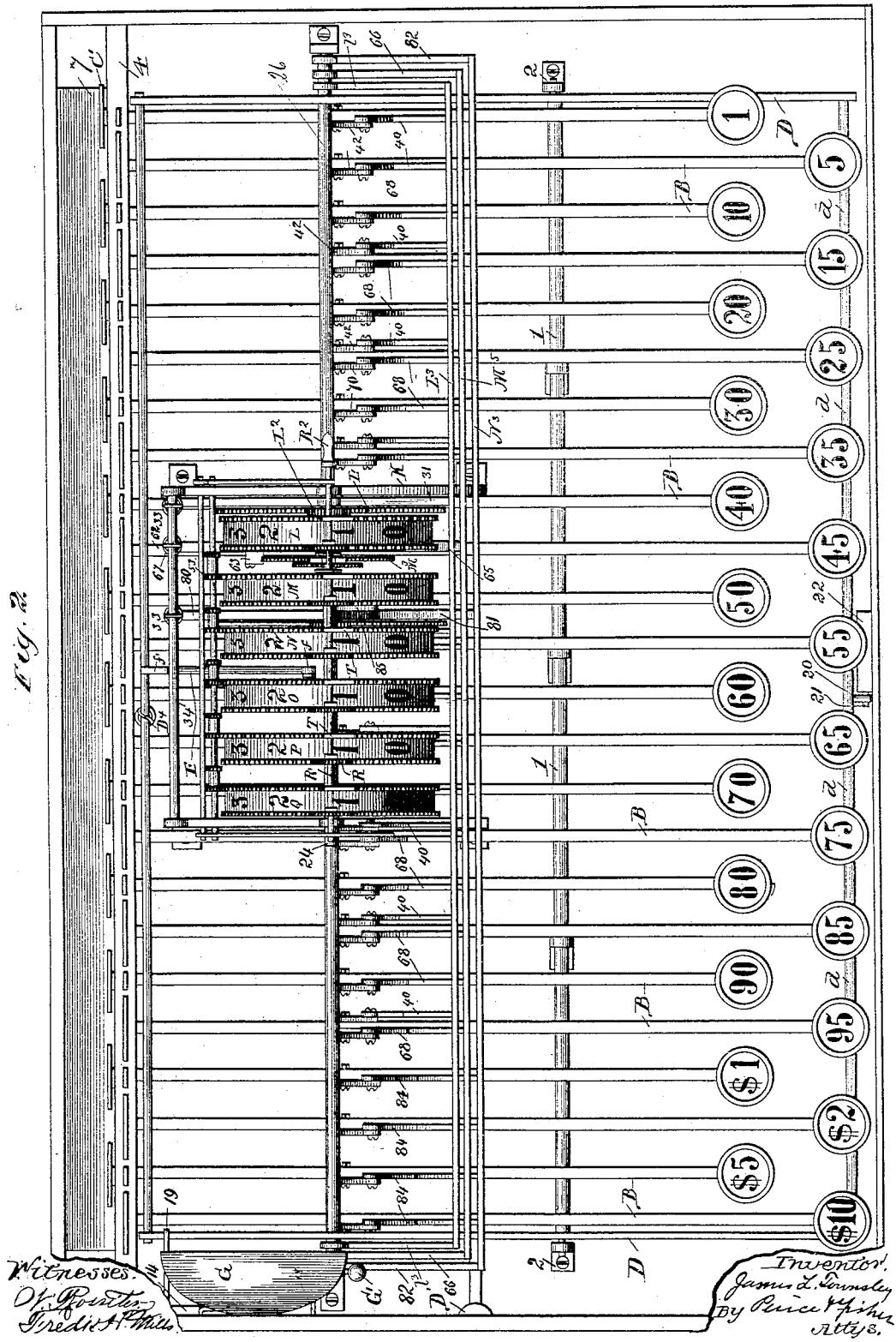

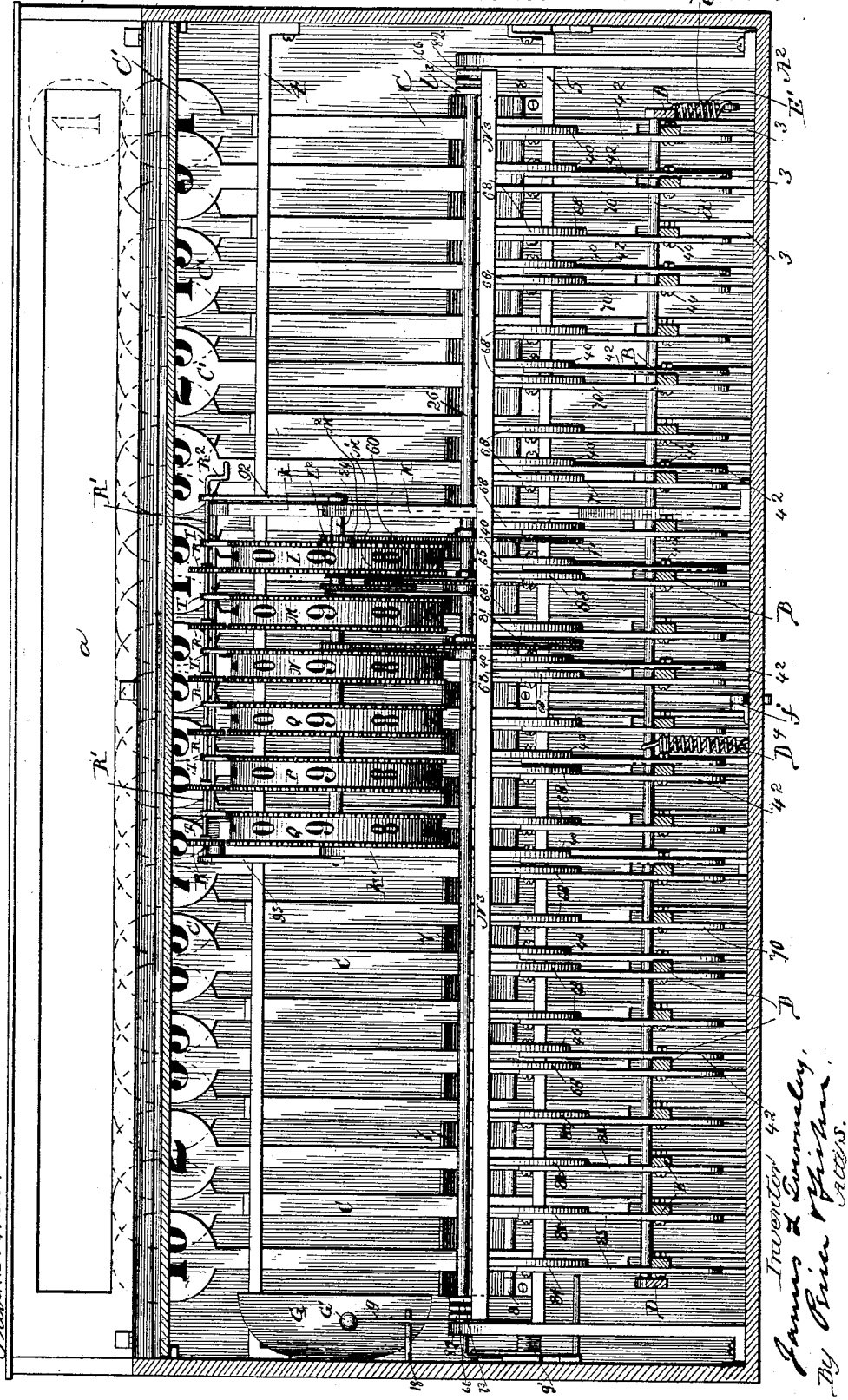

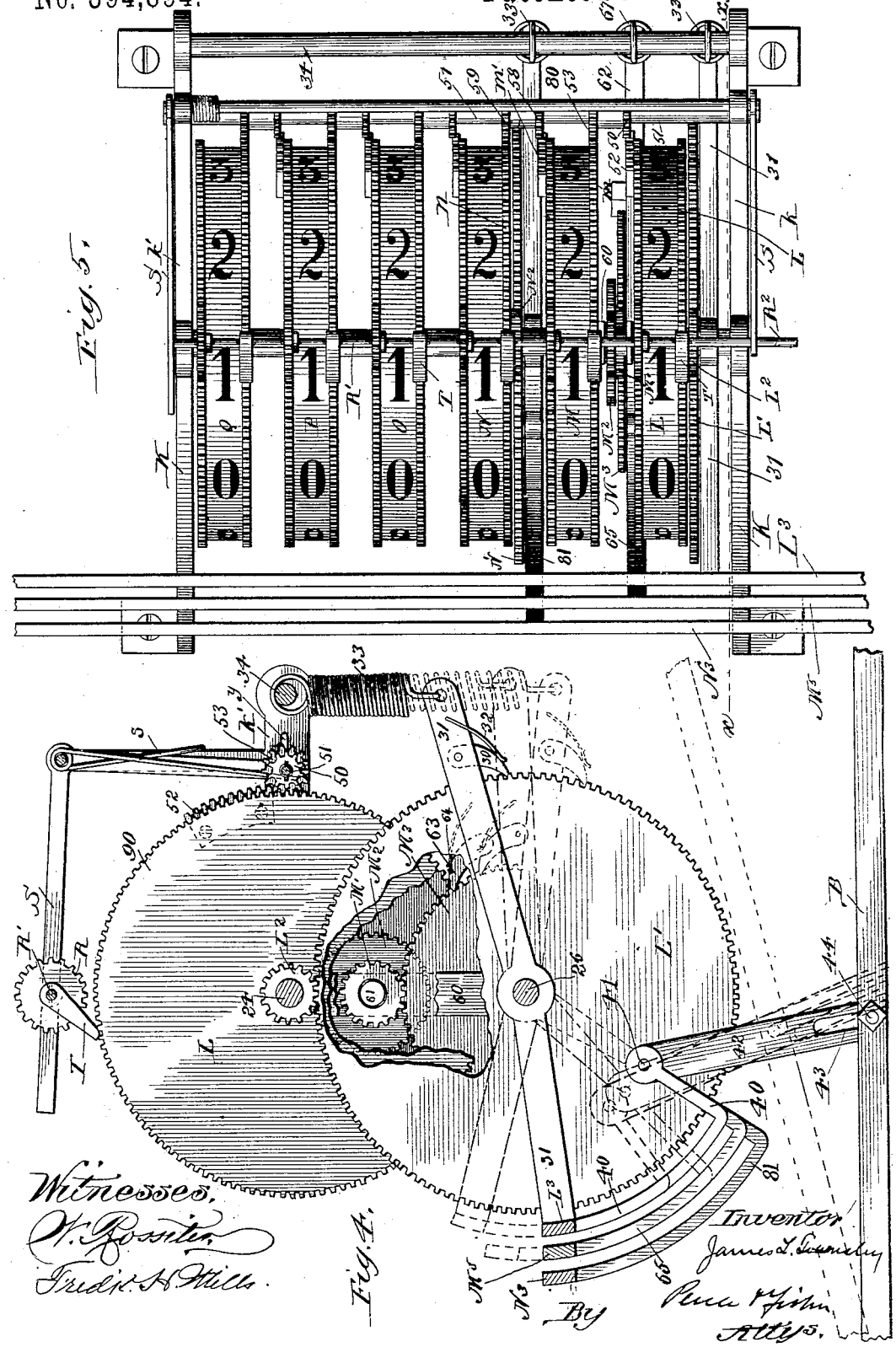

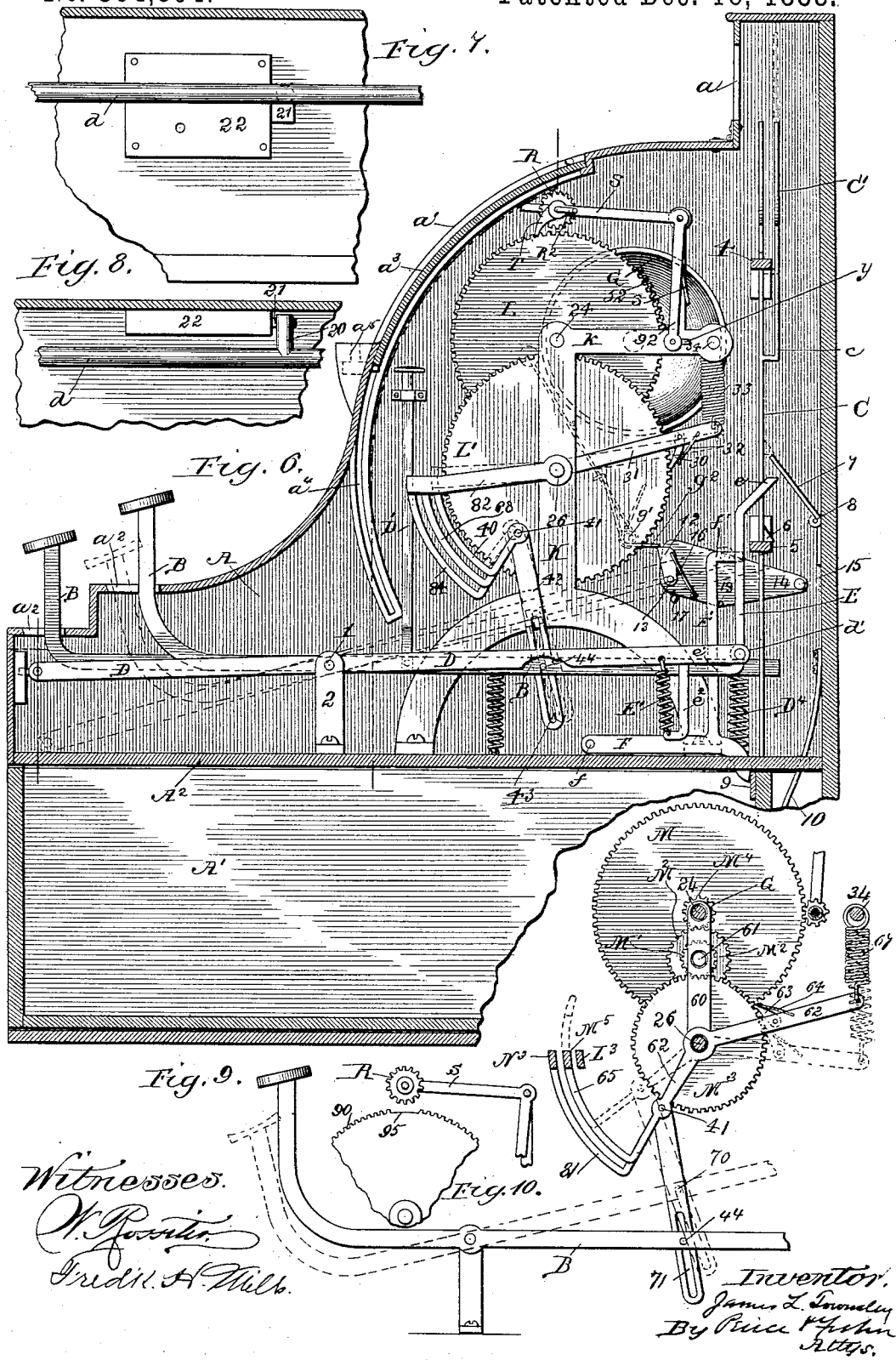

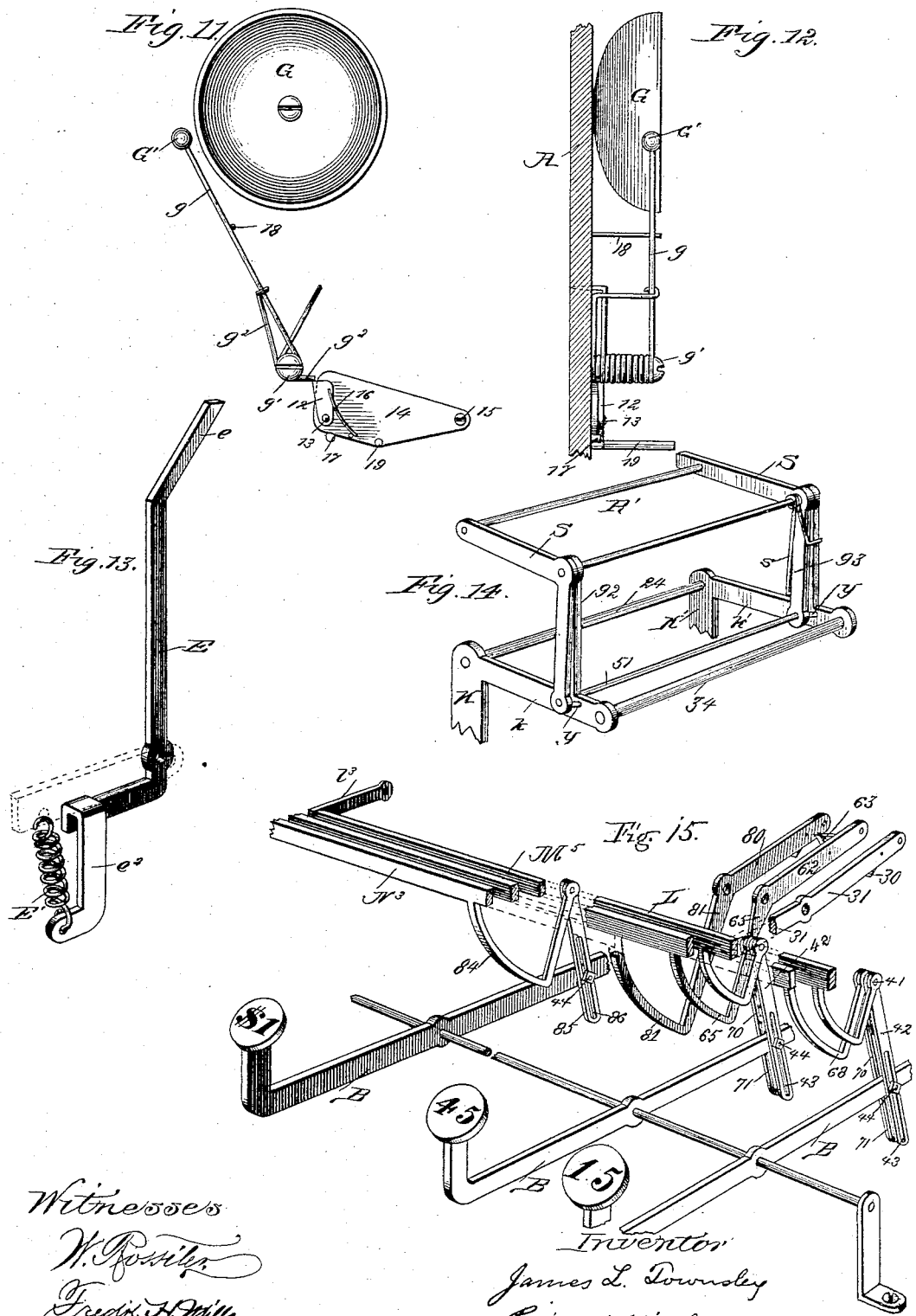

UNITED STATES PATENT OFFICE.

JAMES L. TOWNSLEY, OF CHICAGO, ILLINOIS, ASSIGNOR OF ONE-HALF TO WILLIAM C. NIBLACK, OF SAME PLACE.

CASH REGISTERING AND INDICATING DEVICE.

SPECIFICATION forming part of Letters Patent No. 394,894, dated December 18, 1888.

Application filed May 14, 1888. Serial No. 273,733. (No model.)

*To all whom it may concern:*

Be it known that I, JAMES L. TOWNSLEY, a citizen of the United States, residing at Chicago, in the county of Cook and State of Illinois, have invented certain new and useful Improvements in Cash Registering and Indicating Devices, of which I do declare the following to be a full, clear, and exact description, reference being had to the accompanying drawings, forming part of this specification.

My present invention has relation particularly to that class of devices adapted to indicate to purchasers the amount of their purchases and to register at the same time the amount received by the cashier. In the construction of such devices it has been heretofore the practice to provide a series of key-levers marked with the most frequently-occurring amounts for which purchases are made, the depression of such levers serving to bring into the purchaser's view a corresponding tablet indicating the amount of his purchase and at the same time to register or record the amount thereof. The depression of the lever or levers also served to sound a gong or bell, showing that the register had been operated and at the same time released the mechanism that temporarily locked the change till or drawer, so that if necessary the cashier could make change therefrom.

My present invention has for its object more particularly to improve the registering mechanism of this class of devices, but has also for its object to improve and simplify various other parts of the mechanism. These several objects I have accomplished by the novel features of construction hereinafter described, illustrated in the accompanying drawings, and particularly defined in the claims at the end of this specification.

Figure 1 is a perspective view of a registering apparatus embodying my invention, parts of the casing being broken away for the purpose of better illustration. Fig. 2 is a plan view, the upper portion of the main casing being removed. Fig. 3 is a view in vertical longitudinal section through the key-levers, this section being taken in front of the pivot-shaft of the key-levers, a part of the main casing being removed, and a part of the mechanism being shown in front elevation. Fig. 4 is an enlarged detail view on line $x$ $x$ of Fig. 5. Fig. 5 is an enlarged detail plan view of the register-wheels and adjacent parts. Fig. 6 is a view in vertical cross-section through the main casing adjacent the extreme end thereof, showing the mechanism within this casing in end elevation, parts being broken away and shown in transverse section for purpose of better illustration. Fig. 7 is an enlarged detail back view of a portion of the front of the main casing with the lug attached thereto, and showing the front cross-bar of the releasing-frame. Fig. 8 is a detail plan view of the parts shown in Fig. 7. Fig. 9 is a detail view, in vertical cross-section, through the mechanism that operates the register-wheels, this section being taken at a point adjacent the inner face of the units-wheel M and parts being shown in side elevation. Fig. 10 is a detail fractional end view of a portion of one of the register-wheels and the adjacent cog-wheel and lever. Fig. 11 is a detail view, in side elevation, of the bell and the bell-ringing mechanism. Fig. 12 is a view in front elevation of the parts illustrated in Fig. 11, and showing that position upon the inclosing-casing. Fig. 13 is an enlarged detail perspective view of the releasing-bar and its retracting-spring. Fig. 14 is an enlarged perspective view of a part of the frame K and K' and the elbow-levers S and the shafts carried thereby. Fig. 15 is an enlarged detail perspective view of two of the key-levers and keys and portions of the pawl-operating bars and their connections.

A designates the main inclosing-casing, which may be of any well-known or suitable construction, being preferably provided at its upper portion with a sight-opening, $a$, through which the indicator-tablets may be exposed to view, with an opening, $a'$, above the register-wheels, through which such wheels can be inspected, and with a series of openings, $a^2$, through which the stems of the operating-keys will pass. The opening $a'$ above the registering-wheels will preferably be closed by a door, $a^3$, sliding within ways $a^4$ at the opposite ends of the casing, this door being adapted to be locked, as at $a^5$, so as to keep the register mechanism at all times within the control of the proprietor.

In the bottom of the main casing A is preferably placed the change drawer or till A′, the locking and releasing of which will be presently explained. Upon a shaft, 1, that extends from side to side of the casing and is sustained by suitable standards, 2, resting upon the base-plate $A^2$ of the casing, are pivotally mounted the key-levers B, the front ends of these levers being bent upwardly and being provided with the finger-pieces marked to designate the denomination of each key. The rear end of each of the key-levers B passes through a slot, 3, that is formed in the lower end of the stem C of the corresponding indicator-tablet C′, this stem C being mounted to slide in vertical slots formed in the cross-bars 4 and 5, bolted to the ends of the casing or otherwise suitably sustained. In order to secure compactness in the arrangement of the tablets C′, they are disposed in two rows, the tablets of the rear row being united to their stems C by means of the supplemental stems c, that are bent (see Fig. 1) to permit the tablets to move at the rear of the cross-bar 4. The normal position of the tablets C′ is below the sight-opening a of the main casing; but it is obvious that when either of the key-levers B is depressed its rear end will be raised and the corresponding tablet will be brought opposite the sight-opening.

If desired, a sight-opening may be also formed in the back of the inclosing-casing, and in such event the tablets will be similarly marked upon both sides. Upon each of the tablet rods or stems C is a lug or shoulder, 6, which, when the rods are in their normal position, rests upon the lower cross-bar, 5. When, however, the tablet-rods C are elevated by the movement of the key-levers, the lugs or shoulders 6 pass upward beyond the edge of the latch-bar 7, that is pivotally connected, as at 8, to the back plate of the main casing, and this latch-bar 7, swinging downward as the lug or shoulder 6 passes above the same, will hold any tablet-rod in elevated position after its key-lever has been released, and until another key-lever has been depressed, as will presently appear.

Upon the shaft 1, that sustains the key-levers, is journaled, also, the releasing-frame D, the side bars of this frame being connected together by means of the cross-bars d and d′, that extend from end to end of the machine at its front and rear, respectively. The rear bar, d′, of the releasing-frame extends over and rests upon the rear ends of all of the key-levers B, so that when either of these levers is depressed to bring the corresponding indicator-tablet into view the rear portion of the releasing-frame will be lifted. Upon this rear portion of the releasing-frame D is connected what, for convenience, is designated the "releasing-bar" E, that is preferably journaled upon the cross-bar d′ of the releasing-frame near its end, this releasing-bar E having its upper end bent backwardly, as at e, and having its lower portion bent forwardly, as at e′, and downwardly, as at $e^2$.

It will be observed by reference to Fig. 1 of the drawings that the downwardly-bent portion $e^2$ of the releasing-bar E extends beneath the side bar of the releasing-frame D, and is connected with this side bar by means of the coiled spring E′. From this construction it will be seen that when the releasing-bar E is in its normal position, as seen in Figs. 1 and 6 of the drawings, the coiled spring E′ will tend to raise the lower portion of the releasing-bar E, causing the upper portion, $e^2$, of this bar to bear against the under face of the side bar of the frame D. From this construction it will be seen that if either of the indicator-tablets be in elevated position, as shown by dotted lines in Figs. 3 and 6, its lug or shoulder 6 will rest upon the front edge of the latch-bar 7, and will be sustained thereby until another key-lever be struck, when the releasing-frame D will be lifted and will carry upward the releasing-bar E, the bent upper end, e, of which will strike the latch-bar 7 and force it to swing upward and backward to such extent as to permit the indicator-tablet to drop.

The cash drawer or till A′, when in its normally-closed position, is locked by means of a latch-bar, F, that is pivoted, as at f, to the main casing, the free end of this latch-bar being bent downwardly and passing through a slot in the floor $A^2$ of the casing, and to such extent as to engage with the back plate, 9, of the till or drawer A′. In order to permit the latch-bar F to be withdrawn, so that the cashier can make change, when necessary, for the purchaser, I have provided the latch-bar F with a lifting-rod, F′, rising vertically therefrom, the upper end of this lifting-d g rearwardly bent, as at f′, to such extent that when the releasing-frame D is moved by the key-levers the rear cross-bar, d′, of this frame will strike the bent end f′ of the lifting-rod F′, and thus raise the latch-bar F out of engagement from the back plate, 9, of the till, and will permit a suitable push-spring, 10, to force this till outward, so that when the key-lever is released the latch-bar will not again engage with the back plate until the drawer or till A′ has been closed.

It will be observed that the bent end f′ of the lifting-rod F′, which determines the releasing of the latch-bar F, is at such distance above the cross-bar d′ of the releasing-frame that the latch-bar F will not be lifted, and consequently the till or drawer A′ will not be opened, until about the end of the upward movement of the releasing-frame. Hence it will be seen that the till A′ will not be accessible to the cashier until the releasing-frame has moved so far upward as to insure the lifting of the indicator-tablet in front of the sight-opening, and to insure also a registration of the proper amount, as will be hereinafter more fully described. The front edge of the curved end of the latch-bar F is preferably inclined, as shown, so as to permit the latch-bar to ride over the back plate of the till when the latter is moved to its closed position.

As it sometimes happens that a proprietor is desirous of opening the cash-drawer without operating the registering mechanism or exposing the indicator-tablets, I have provided the releasing-frame D with a blank releasing-key, D', the lower end of which is attached to one of the side bars of the releasing-frame, while its upper end is provided with a suitable lifting-piece to permit it to be grasped by the fingers. This releasing-key D' is sustained upon the inside of the inclosing-casing, so that access thereto can be had only by the proprietor after the sliding door $a^3$ in the front of the casing has been unlocked and opened. It is obvious that as this releasing-key D' is connected with the releasing-frame D the lifting of such key will raise the rear end of the releasing-frame, and will cause the latch-bar F to be lifted to such extent as to unlock the drawer or till A'; but as the releasing-key D' is in nowise connected with the indicator-tablets or with the registering mechanism such lifting of this key will have no effect upon either the indicating or the registering mechanism.

In order to direct attention, also, to the fact that the registration of the amount of the purchase has been made, I provide the improved bell-ringing mechanism, next to be described. To one side of the main casing A is affixed the bell or gong G, the hammer G' of which is preferably sustained by a suitable spring rod or wire, $g$, journaled upon a stud, $g'$, projecting from the side of the main casing, one end of this wire $g$ being fastened, so as to prevent the turning of the wire upon the stud. Upon the stud $g'$ is also journaled a stiff coil trip-wire, $g^2$, the upper end of which is bent to form a loop that encircles the hammer rod or wire $g$, while its lower end projects backwardly into proper position to be engaged by a trigger, 12, that is pivotally mounted, as at 13, upon a lifting-plate, 14, that is pivoted, as at 15, to one side of the inclosing-casing. (See Figs. 2, 6, 11, and 12.)

To the back of the trigger 12 is attached a light spring, 16, that serves to hold the free upper end of the trigger in position to engage with the free end of the trip-rod $g^2$, but permits the trigger to be forced backward during its downward movement. A suitable stop, 17, projecting from the inclosing-casing, serves to limit the downward movement of the lifting-plate 14, and a similar stop, 18, projecting from one side of the inclosing-casing, as seen at Figs. 3, 11, and 12, may also be used to limit the movement of the bell-hammer rod.

From the inner side of the lifting-plate 14 projects a stud or pin, 19, into the path of the adjacent side bar of the releasing-frame D, so that when the releasing-frame is lifted by the depression of either of the key-levers the side bar of this frame will engage with the pin or stud 19 of the lifting-plate 14, and will cause this plate 14 to be swung upwardly, and this upward movement of the lifting-plate 14 will cause the trigger 12 to turn the trip-wire $g^2$ and move backward the bell-hammer G' against the force of its spring-rod $g$. When, however, the lifting-plate 14 has been raised by the releasing-frame to such extent that the upper end of the trigger 12 escapes from the end of the trip-rod $g^2$, the spring-rod $g$ of the bell-hammer G' will spring inwardly, causing the hammer to sound the bell. When the key-lever is released, and the releasing-frame is thus allowed to fall, it is obvious that the lifting-plate 14 will drop, and in this operation the free end of the trigger 12 will ride over the end of the trip-rod $g^2$, being moved backward against the action of the light spring 16.

It will be observed that the lifting-plate 14 is located at such distance above the releasing-frame that the bell will not be sounded until the releasing-frame has about completed its upward movement, and until the indicator-tablet has been brought to view and the operation of the registering mechanism has occurred.

The front cross-bar, $d$, of the releasing-frame D is, by preference, provided with a lug or stud, 20, that projects above the bolt 21 of a lock, 22, that is affixed upon the inside of the main casing, as more particularly shown in Figs. 7 and 8, so that when the bolt 21 of the lock 22 is thrown the operation of the releasing-frame is clogged, and consequently the movement of the key-levers, the opening of the till, and the operation of the registering mechanism are prevented.

In order to effect the registration of the amounts successively shown by the indicator-tablets, I have provided the improved mechanism next to be described. Between suitable standards, K and K', that are sustained upon the base-plate $A^2$ of the main casing, are placed the registering-wheels L, M, N, O, P, and Q, these several wheels being journaled upon a common shaft, 24, the ends of which are held within the standards K and K'. Each of these registering-wheels is marked with a single set of digits, the wheel L (for convenience termed the "units-wheel") indicating fractions of a dollar below ten cents and indicating the right-hand figure of any greater sum, the wheel M (termed the "decimal-wheel") indicating the decimal or second figure of any sum, the wheel N (termed the "dollar-wheel") indicating the third or hundred figure in any sum, the wheel O indicating the fourth or thousand figure, the wheel P indicating the fifth or ten-thousand figure, and the wheel Q the sixth or hundred-thousand figure in any sum. Hence it will be seen that the wheels L and M will indicate cents or fractions of a dollar, while the remaining wheels will indicate dollars only.

Each of the register-wheels is mounted upon the shaft 24 independently of the remaining wheels; but the wheels indicating lower denominations are connected with the wheels of higher denominations by means of an intermittent "one-way" gear or carrying mechanism, so that while any wheel may be operated independently and without affecting the wheels of lower denominations the operation of such wheel will at all times be transferred to and will at the proper time produce its effect upon the wheels of higher denominations. My purpose in thus mounting and gearing the register-wheels provided with a series of digits is to enable the sum total of all the amounts received by the cashier to be immediately read from the register-wheels without the necessity of adding up the sums indicated by the wheels individually. Each of the register-wheels (or as many as it may be necessary at any time to operate separately) is provided with individual pawl-and-ratchet mechanism and with indiviual multiplying-gear mechanism, which enables movement to be imparted to said wheels from the various key-levers B.

Upon the shaft 26 and adjacent the standard K is mounted the ratchet-wheel L', that gears with the multiplying-pinion L², that is affixed to the side of the units-wheel L, so that when motion is imparted to the ratchet-wheel L' through the pawl mechanism to be presently described such motion will be transmitted through the multiplying-pinion L² to the units-wheel L. The ratchet-wheel L' receives its motion from a pawl, 30, that is pivotally mounted near the end of the pawl bar or lever 31, the pawl being pressed into normal engagement with the ratchet-wheel L' by means of a flat spring, 32, affixed to the bar 31. (See Fig. 6.) This bar 31 is loosely mounted upon the shaft 26 next to the standard K, and is connected at its outer end to a pawl-operating bar, L³, that extends from side to side of the machine above the key-levers, and is sustained by the end bars, l³, that are journaled upon the shaft 26, as clearly seen in Figs. 2, 3, and 15 of the drawings.

To the rear end of the pawl-bar 31 is attached the coil-spring 33, the opposite end of this spring being held by a rod, 34, that extends between the standards K and K', and is held by the rearwardly-projecting arms k and k' of such standards, this spring 33 serving to normally hold the bar 31 and pawl 30 at their highest position, as seen in Figs. 4 and 6 of the drawings. From the pawl-operating bar L³, which may be termed the "units-bar," since it operates merely the first of the register-wheels, extends downwardly a series of arms, 40, to the lower bent ends of which are pivotally attached, as at 41, the lost-motion links or connections 42, that are provided with slots 43, through which pass the pins 44, that serve to unite the links 42 with the key-levers B. (See Fig. 15.) The slots 43, that are formed in the links or lost-motion connections 42, are of varying lengths, as more clearly shown in Fig. 1 of the drawings, the purpose of this being to enable each key-lever that operates the units-wheel to impart to the pawl-operating or units bar 31 vibrations of different lengths, and consequently to impart to the ratchet-wheel L' different degrees of partial rotation. Thus it will be seen that the link 42 connected with the key-lever B that is operated by the "one-cent" key has a slot, 43, of much greater length than the corresponding link 42 that is connected with the key-lever of the "five-cent" key, the result therefore being that when the key-lever of the one-cent key is operated there will be much greater lost motion and correspondingly less vibration or movement of the pawl-operating bar 31 and of the ratchet-wheel L'.

It will also be seen that if a key-lever—as, for example, the one-cent key-lever—be depressed it will cause the pin 44 to ride upward in the slot 43 until this pin strikes the upper edge of the slot 43, after which the further upward movement of the key-lever will lift the link 42 and will vibrate the pawl-operating or units bar 31, causing the pawl 30 to move downwardly and impart a partial revolution to the ratchet-wheel L'.

The extent of motion imparted to the ratchet-wheel L' from the one-cent key-lever will be but very slight, since it need be sufficient only to transmit one-tenth of a revolution to the multiplying-pinion L² and a corresponding one-tenth revolution to the larger wheel, L, for it is obvious that if the units-wheel L be at zero and a tenth part of a revolution is given thereto it will bring the figure "1" to the point previously occupied by the zero-mark. When, however, the lever of the five-cent key is depressed, (or the lever of any key marked with an odd multiple of 5,) the upward movement of such lever will, by reason of the shortness of the slot 43 and consequent less lost motion, impart more movement to its link 42 and a correspondingly greater downward movement to the pawl 30, and as well, also, a greater extent of revolution to the ratchet-wheel L' and units-wheel L. In other words, when such key-lever is operated it will revolve the ratchet-wheel L' to such extent as to cause the multiplying-pinion L² to make one-half of a complete revolution and will cause the units-wheel L to be revolved half-way round until the figure "5" reaches the point before occupied by the zero-mark. As the key-lever in thus operating the register-wheel L has lifted the releasing-frame D against the force of its spring D⁴, and has lifted the pawl-operating bar 31 against the force of the coil-spring 33, it is plain that when the pressure on the key is released the coiled spring D⁴ will restore the releasing-frame and the key-lever to their normal positions, and the spring 33 will retract the pawl 30 and pawl-operating bar 31 to their highest positions. In order to impart to the wheel M, which, for convenience, may be termed the "decimal-wheel," the aggregate of the revolutions made by the units-wheel L, I employ a suitable intermittent one-way gear or carrying mechanism. The particular gear or carrying mechanism illustrated in the drawings consists of a pinion, 50, that is keyed upon a shaft, 51, carried by the lower ends of the elbow-levers S and projecting through the slots $y$, (see Fig. 15,) formed in the arms $k$ and $k'$ of the standards K and K', this pinion 50 meshing in a segmental gear-plate, 52, that is attached to the side of the register-wheel L, and upon this shaft 51 is also keyed a pinion, 53, that engages with the gear-teeth $m$, formed upon the flanged edge of the wheel M. Hence it will be seen that when the units-wheel L has made approximately one complete revolution the engagement of the segmental gear-plate 52 with the pinion 50 will transmit revolution to the shaft 51 and the pinion 53, which latter pinion will impart a partial revolution to the decimal-wheel M, sufficient to move it a distance equal to the space between two digits, so that each time the units-wheel L makes a complete revolution and its zero-mark is brought to the starting-point such revolution will be transferred through the carrying mechanism to the decimal-wheel M.

As the decimal-wheel M serves not merely to register the number of revolutions of the units-wheel L, but also has independent revolutions imparted thereto, the mechanism by which such independent revolutions are imparted to this wheel will next be described. Between the shafts 24 and 26 extend the vertical bars 60, that serve to sustain the axle 61 of the multiplying gear-wheels M' and M², that are joined together, the smaller wheel or pinion, M', receiving motion from the ratchet-wheel M³, and the larger wheel, M², transmitting motion to the pinion M⁴, that is fixed to and revolves with the decimal-wheel M. (See Figs. 4 and 9.) Upon the shaft 26, adjacent the ratchet-wheel M³, is journaled the pawl bar or lever 62, that carries the pawl 63, that serves to impart movement to the ratchet-wheel M³, this pawl 63 being forced into normal engagement with the ratchet-wheel by means of the spring 64. The outer portion, 65, of the pawl-bar 62 is formed of the angular shape shown, (see Fig. 9,) the upper end of this bar being connected to the pawl-operating bar M⁵, that extends from side to side of the machine in a manner similar to the pawl-operating bar L³, before described, the ends of the bar M⁵ being connected to the end bars, 66, that are journaled upon the shaft 26. The inner end of the pawl-bar 62 is connected with the coil-spring 67, the opposite end of which is attached to the cross-bar 34, this spring serving to normally hold the bar 62 and pawl 63 at their highest position.

From the pawl-operating bar M⁵, which may be termed the "decimal-bar," since it serves to operate the decimal-wheel M, depend a number of arms, 68, to the lower ends of which are pivoted the upper ends of the links or lost-motion connections 70, having slots 71 formed therein (see Fig. 15) to receive the pins 44 of the key-levers B. In like manner, also, a link, 70, is pivoted to the pawl-bar 62, so that this bar 62, in addition to its functions above described, has also the function of one of the arms 68. The slots of the links 70 are of different lengths for the different keys, the purpose of this construction being to enable the levers which operate the pawl-and-ratchet mechanism of the decimal-wheel to impart to such wheel a partial revolution of greater or less extent, according to the value of the key that is struck. Thus it will be seen that the link 70 with which is connected the lever of the "thirty-five-cent" key (see Fig. 15) has a very long slot, seven-tenths of the motion of its key-lever being lost motion, because in order to move the decimal-wheel the distance of three spaces but very slight motion of the ratchet-wheel M³ is required, whereas the link 70 that connects a decimal-key of higher denomination (say the "ninety-cent" key) will have a slot so short that there will be no appreciable lost motion, since with such key it is necessary to move the ratchet-wheel M³ a sufficient distance to impart an almost complete revolution to the decimal-wheel M.

It will be observed that the pawl-bar 62 sustains the pawl 63 in such manner that during the lifting of the key-levers this pawl will merely ride downwardly over the teeth of the ratchet-wheel without imparting movement thereto; but when the key-lever is released the upward movement of the pawl incident to the force of the coiled spring 67 will cause the pawl to engage with and turn the ratchet-wheel M³.

From what has been said it will be seen that if the ratchet-wheel M³ is moved a very small part of a revolution the multiplying gear-wheels connecting such ratchet-wheel with the decimal-wheel M will serve to give to the decimal-wheel any desired extent of revolution.

It will be observed that the key-levers of the keys marked with even multiples of five—that is to say, the "ten-cent," "twenty-cent," "thirty-cent" keys, and so on—are connected with but one of the pawl-operating-bars—viz., the decimal-bar M⁵—the reason of this being that when an even-decimal sum—say, for example, ten, twenty, or thirty cents—is registered, it is only necessary to correspondingly advance the decimal-wheel. It will be observed, however, that the levers of the keys marked with the odd multiples of five above the first power are connected not merely by the links 42 with the units-bar L³, but also by the links 70 with the decimal-bar M⁵, the reason for this construction being that when an amount expressed by an odd multiple of five (say thirty-five cents) is to be registered, it is necessary to operate both the decimal-wheel and the units-wheel. Thus it will be seen that if the lever of the thirty-five-cent key be depressed it will during its upward movement lift, through the medium of the link 42, the units-bar L³, and by means of the pawl-bar 31 will cause the pawl 30 to impart a sufficient movement to the ratchet-wheel L' to give to the units-wheel such part of a revolution as will move this wheel five spaces, and during its upward movement this key-lever will also lift the decimal-bar M⁵ and cause the pawl 63 to ride downward upon the ratchet-wheel M³, so that when the key-lever is released and this pawl 63 is restored to its normal position by the coiled spring 67 the ratchet-wheel M³ will be moved a sufficient extent to impart to the decimal-wheel so much of a revolution as is necessary to move the same the extent of three spaces. Hence if the register-wheels be at zero when the lever of the thirty-five-cent key is thus operated the result will be to first cause the units-wheel to register "5," and afterward cause the decimal-wheel to register "3," thus indicating that a purchase of thirty-five cents has been made.

My object in arranging the pawl-and-ratchet mechanism of the units-wheel and of the decimal-wheel in such manner that the movement of the wheels shall be effected at different times—that is to say, one upon the upstroke and the other upon the downstroke of the key-lever—is to insure the proper adding to the decimal-wheel any complete revolution that may be made of the units-wheel at the time that a key operating both wheels is struck, since, if the units-wheel should be moved from the digit 9 past the zero-point at the same time that the decimal-wheel was being moved the complete revolution made by the units-wheel would be lost. Thus, for example, if the units-wheel showed a registration of eight cents and the lever of the thirty-five-cent key should be struck, a complete revolution of the units-wheel would be made and a partial revolution of the decimal-wheel would result from the operation of the ratchet-wheel L', and afterward, by the operation of the ratchet-wheel M³ during the downstroke of the key-lever, the decimal-wheel would be moved three additional spaces, so that the total indicated by these two wheels would be forty-three cents, whereas if the units and decimal wheels had been moved in unison they would have registered but thirty-three cents.

The wheel N next to the decimal-wheel M is connected with the decimal-wheel M by an intermittent gear or carrying mechanism of the same kind as that which connects the units and decimal wheels—that is to say, the decimal-wheel is provided at its periphery with a segmental gear-plate, $m'$, that engages with a pinion, 58, upon the shaft 51, a similar pinion, 59, upon this same shaft gearing with the teeth $n$, formed upon the flanged periphery of the register-wheel N. From this construction it will be seen that each time the decimal-wheel M makes one complete revolution the segmental gear-plate $m'$ will engage with the pinion 58, and, through the medium of this cog-wheel and the pinion 59 and shaft 51, will impart a partial rotation to the wheel N, sufficient to advance this wheel the distance of one digit. The wheel O is geared with the wheel N, and the wheel P with the wheel O, and the wheel Q with the wheel P by means of segmental gear-plates and pinions similar to those which connect the units and decimal wheels, so that whenever either of the wheels N, O, or P receives a complete revolution the next wheel of higher denomination will be advanced to the extent of one digit.

In order to enable the wheel N to be moved independently of the decimal and units wheels when it is necessary to register an even number of dollars from one to ten, I have provided this wheel N with a ratchet-wheel, N', mounted upon the shaft 26, and a multiplying gear-wheel, N², mounted upon the shaft 24 and affixed to the wheel N, this ratchet-wheel and multiplying gear-wheel being the same in construction and mode of operation as the ratchet-wheel and multiplying gear-wheel of the units-wheel L. A pawl precisely like that which operates the ratchet-wheel L' also serves to impart motion to the ratchet-wheel N', this pawl being attached to the pawl-bar 80, that is journaled upon the shaft 26, and has its front end bent to form the angular portion 81, that connects with the pawl-operating bar N³, that extends from side to side of the machine, and is connected with the end bars, 82, that are journaled upon the shaft 26. This bar N³, which, for convenience, may be designated the "dollar-bar," since it operates the first of the series of dollar-registering wheels, is connected with all the key-levers of keys marked with values above fractions of a dollar by means of depending bars 84 and links or lost-motion connections 85, that are provided with the slots 86, through which pass the pins 44, that unite the links to the key-levers B. The slots 86 of the links or lost-motion connections 85 will be of different lengths, so as to impart a greater or less extent of revolution to the register-wheel N, this operation being apparent from what has been said with respect to the corresponding operating mechanism of the units-wheel. In like manner, also, the link 85 may be pivoted to the angular portion 81 of the pawl-bar 80, so that this pawl-bar shall have the additional function of one of the depending arms 84.

From this construction it will be seen that when either of the dollar-keys is depressed a partial revolution will be given to the ratchet-wheel N' and will be transmitted through the multiplying gear-wheel N² to the register-wheel N. My purpose in arranging the units-bar L³, the decimal-bar M⁵, and the dollar-bar N³, and the connections leading from such bars to the respective pawl-bars, is to avoid the interference of these bars one with the other in their operation.

From the construction as above defined it will be seen that the operator is enabled by striking a single key not only to expose at the sight-opening of the casing the amounts of the purchase and to sound the gong and release the drawer or till, but, as well, also enabled to register the various amounts received from purchasers in such manner that the total can be read at a glance from the register-wheels.

It is obvious that, if desired, separate pawl-and-ratchet mechanisms and multiplying-gear mechanism similar to that used upon the units-wheel L and the wheel N may be employed upon the register-wheels of higher denomination, and, if desired, also additional key-levers may be employed indicating any desired amounts, it being simply necessary to connect such key-levers with the pawl-and-ratchet mechanism and with the appropriate register-wheels.

In order to return the register-wheels to the zero-point, I have provided each of such wheels with a gear-flange, 90, with the teeth of which will engage the cog-wheels R, fixed upon the shaft R', that is journaled in the forward ends of the elbow-levers S, this shaft R' being provided with a crank-handle, R², whereby it can be readily turned. In the lower ends of these elbow-levers S is held the shaft 51, that passes through the slot $y$ of the arms $k$ and $k'$, these slots serving to limit the vibratory movement of the elbow-levers, and, as has been already seen, on this shaft 51 are sustained the several pinions 50 53, &c., of the carrying mechanism. The elbow-levers S are pivotally mounted upon the uprights 92 and 93 of the standards K and K', and the dependent ends of these elbow-levers are pressed normally in forward direction by means of a spring, s, that is attached to the upright 92, and bears upon the rear edge of the lever, thus holding the pinions 50 53, &c., in engagement with their respective parts. It will thus be seen that by pivotally mounting the elbow-levers that sustain the cog-wheels R and elevating the upper ends of such levers by the springs s the cog-wheels R will be held normally above and out of engagement with the toothed flanges of the various register-wheels. It will be seen, however, that when the upper ends of the elbow-levers S are depressed the pinions 50 53, &c., of the carrying mechanism will be thrown out of action by the backward movement of their shaft 51, while at the same time the wheels R will be brought into engagement with the toothed flanges of the several wheels, after which, by turning the crank-handle of the shaft R', the several gear-wheels can be restored to the zero-points. It will be observed by reference to Fig. 10 of the drawings that the gear-flange 90 of each of the register-wheels is provided with a blank space, 95, the purpose of this space being to prevent the cog-wheels R from turning the register-wheels beyond their zero-points. Upon the shaft R' is also mounted a series of pawls, T, one for each register-wheel, these pawls being provided with rounded ends and serving to engage with the toothed flanges of the register-wheels to such extent only as to prevent the accidental movement of these wheels in backward direction, it being understood, however, that when the shaft R' is depressed in order to cause the engagement of the cogs R with the toothed rims of the register-wheels the rounded ends of the pawls T will simply ride out of the teeth and will not interfere with the bringing of the register-wheels to the zero-points.

Having thus described my invention, what I claim as new, and desire to secure by Letters Patent, is—

1. In a cash register and indicator, the combination, with suitable key-levers, suitable vertically-movable tablet-rods provided with lugs or shoulders, and a latch-bar for engagement with said lugs or shoulders, of a releasing-frame having a bar extending across the key-levers, and a releasing-bar pivotally mounted on said frame, substantially as described.

2. In a cash register and indicator, the combination, with key-levers B, the tablet-rods C', having lugs or shoulders, and the hinged latch-bar 7, of a pivoted releasing-frame, D, having a cross-bar, $d'$, extending over the inner ends of the levers B, a releasing-bar, E, pivoted to said releasing-frame, and a spring, E', for pressing the upper end of said releasing-bar normally backward to engage the latch-bar, substantially as described.

3. In a cash register and indicator, the combination, with the key-levers B, of a releasing-frame, D, having the cross-bars $d$ and $d'$, the cross-bar $d$ being provided with a lug, 20, and a suitable lock, 22, adapted to engage with the lug 20 and dog the movement of the releasing-frame, substantially as described.

4. In a cash register and indicator, the combination, with suitable key-levers, of a releasing-frame, D, having a cross-bar, $d'$, and a latch-bar, F, for locking the till or drawer, said latch-bar being provided with a lifting-rod the upper end of which extends above the cross-bar of the releasing-frame, substantially as described.

5. In a cash register and indicator, the combination, with the inclosing-casing, the key-levers, a releasing-frame located within said casing, and a latch-bar for locking the till, of a blank key, D', located within the casing and connected with the releasing-frame, substantially as described.

6. In a cash register and indicator, the combination, with suitable key-levers, a releasing-frame engaging with said key-levers, a lifting-plate adapted to be struck by said releasing-frame, a trigger carried by said lifting-plate, a trip-rod, a bell-hammer rod connected with said trip-rod, and a bell, substantially as described.

7. In a cash registering and indicating apparatus, the combination of a units-wheel, a decimal-wheel, and a dollar-wheel, each serving when operated to indicate a single figure in the sum total of the amounts registered, a carrying device connecting said wheels, independent pawl-and-ratchet mechanism for two or more of said wheels, whereby the decimal-wheel can be operated independently of the units-wheel and the dollar-wheel can be operated independently of the decimal-wheel, a units-bar, a decimal-bar, and a dollar-bar for controlling, respectively, the movement of said wheels, a series of independent pivoted key-levers for imparting different extents of movement to the decimal-wheel, and connected with the decimal-bar, a series of independent pivoted key-levers for imparting different extents of movement to the dollar-wheel, and connected with the dollar-bar, and a series of vertically-movable tablet-rods controlled by said pivoted key-levers, substantially as described.

8. In a registering apparatus, the combination of a units-wheel, a decimal-wheel, and one or more dollar (or hundredth) wheels, said several wheels being capable of independent operation, and each serving when operated to indicate a single figure in the sum total of the amounts registered, suitable carrying mechanism connecting said wheels, suitable mechanism for imparting rotation to said wheels, and a series of key-levers, certain of said levers being connected with the operating mechanism of two of said wheels and serving to operate by a single movement, but at different times, two of said wheels, substantially as described.

9. In a cash-registering apparatus, the combination, with suitable key-levers, of a units-wheel, a decimal-wheel, and one or more dollar-wheels, a suitable carrying mechanism connecting said wheels, and several independent pawl-and-ratchet mechanisms for said wheels, the pawl-and-ratchet mechanism of the units-wheel being arranged for operation by certain of the key-levers of a higher denomination, substantially as described.

10. In a cash-registering apparatus, the combination of a units-wheel, a decimal-wheel, and one or more dollar-wheels, and a carrying mechanism connecting said wheels, a multiplying-gear for one of said wheels, a pawl-and-ratchet mechanism for said multiplying-gear, and a series of keys for imparting different degrees of rotation to the ratchet mechanism of the multiplying-gear, substantially as described.

11. In a cash-registering apparatus, the combination of a units-wheel, a decimal-wheel, and one or more dollar-wheels, each marked with a single set of digits, suitable carrying mechanism for said wheels, individual pawl-and-ratchet mechanism, and multiplying-gear mechanism for said wheels, and a series of key-levers connected with the pawl-and-ratchet mechanism of each wheel, substantially as described.

12. In a cash-registering apparatus, the combination, with suitable key-levers, of register-wheels, one or more of said wheels being provided with a multiplying-gear, a pawl and ratchet engaging with said multiplying-gear, a bar for operating said pawl, and a lost-motion connection for transmitting movement from the key-levers to the bar, substantially as described.

13. In a cash-registering apparatus, the combination, with suitable key-levers, of register-wheels, an intermittent gear device connecting said wheels, individual pawls and ratchets for the wheels, separate operating-bars for each of said pawls, and separate connections extending from said operating-bars to the same key-levers, whereby certain of the key-levers may operate two or more register-wheels, substantially as described.

14. In a cash-registering apparatus, the combination, with suitable key-levers, of a units-wheel, a decimal-wheel, and one or more dollar-wheels, an intermittent gear device connecting said wheels, individual pawls and ratchets for said wheels, individual multiplying-gear between the register-wheels and the ratchet-wheels, a units-bar, a decimal-bar, and a dollar-bar connected with said individual pawls, and a series of lost-motion connections or links extending between the key-levers and said bars, substantially as described.

15. In a cash-registering apparatus, the combination, with suitable key-levers, of a series of register-wheels, an intermittent gear device connecting said wheels, individual pawls and ratchets for said wheels, said pawls and ratchets being connected with certain key-levers, whereby said key-levers shall operate one of said wheels on its forward stroke and another of said wheels on its return-stroke, substantially as described.

16. In a cash-registering apparatus, the combination, with suitable key-levers, of a units-wheel, a decimal-wheel, and one or more dollar-wheels, said wheels being each marked with a single set of digits, a common shaft whereon said wheels are independently mounted, an intermittent gear device connecting said wheels, individual pawls and ratchets for said wheels, and suitable lost-motion connections or links extending from said pawls into position for engagement with the key-levers and pawl-operating bars, substantially as described.

17. In a cash-registering apparatus, the combination, with suitable key-levers, of a series of register-wheels, each marked with a single set of digits and provided with gear-teeth, a carrying mechanism connecting said register-wheels and mounted upon a movable shaft, and a movable shaft provided with cog-wheels for restoring said register-wheels to their zero-points, whereby said carrying mechanism can be thrown out of engagement with the register-wheels when the cog-wheels are thrown into engagement with said register-wheels, substantially as described.

18. In a cash-registering apparatus, the combination, with said key-levers, of a series of register-wheels, each marked with a single set of digits and provided with suitable gear-teeth, a series of cog-wheels for restoring said register-wheels to their zero-points, said cog-wheels being movably sustained, a carrying mechanism connecting the said register-wheels and also movably sustained, and suitable elbow-levers for conjointly operating said cog-wheels and carrying mechanism, substantially as described.

JAMES L. TOWNSLEY.

Witnesses:
GEO. P. FISHER, Jr.,
I. B. CARPENTER.